US 7,611,615 B2

(12) United States Patent
Cohen et al.

(10) Patent No.: US 7,611,615 B2
(45) Date of Patent: Nov. 3, 2009

(54) PROCESS FOR MANUFACTURING A METAL ELECTRODE

(75) Inventors: Nissim Cohen, Kiryat Haim (IL); Israel Schuster, Kiryat Tivon (IL); Ludmila Cherniak, Haifa (IL); Tali Peled, Haifa (IL)

(73) Assignee: Cerel (Ceramics Technologies) Ltd., Tirat Hacarmel (IL)

( * ) Notice: Subject to any disclaimer, the term of this patent is extended or adjusted under 35 U.S.C. 154(b) by 917 days.

(21) Appl. No.: 10/480,875

(22) PCT Filed: Jun. 13, 2002

(86) PCT No.: PCT/IL02/00458

§ 371 (c)(1),
(2), (4) Date: May 18, 2004

(87) PCT Pub. No.: WO02/103728

PCT Pub. Date: Dec. 27, 2002

(65) Prior Publication Data

US 2004/0195093 A1 Oct. 7, 2004

(30) Foreign Application Priority Data

Jun. 14, 2001 (IL) .................................... 143780

(51) Int. Cl.
*C25D 13/00* (2006.01)
(52) U.S. Cl. ................ 204/471; 204/490; 204/491; 75/10.26; 75/10.25; 75/622; 75/330; 438/688; 438/778; 438/785

(58) Field of Classification Search ................ 204/471, 204/490, 491; 75/10.25, 10.26, 622, 330; 438/688, 778, 785
See application file for complete search history.

(56) References Cited

U.S. PATENT DOCUMENTS

| 3,400,019 | A | * | 9/1968 | Le Duc ........................ 429/42 |
| 3,553,093 | A | * | 1/1971 | Putnam et al ................. 430/32 |
| 4,067,735 | A | | 1/1978 | Bezruk et al. |
| 5,795,456 | A | * | 8/1998 | Friedman et al. ............ 204/484 |
| 5,919,347 | A | | 7/1999 | Gal-Or et al. |
| 6,059,949 | A | | 5/2000 | Gal-Or et al. |
| 6,127,283 | A | | 10/2000 | Gal-Or et al. |

FOREIGN PATENT DOCUMENTS

| JP | 10-189994 | 7/1998 |

* cited by examiner

*Primary Examiner*—Alexa D Neckel
*Assistant Examiner*—Xiuyu Tai
(74) *Attorney, Agent, or Firm*—Reed Smith LLP

(57) ABSTRACT

The present invention provides a process for manufacturing a porous metal electrode, wherein the porosity degree is in the range of 30 to 50% and the metal is capable of forming a stable, uniform, oxide layer having a dielectric constant greater than 25 ($k \geq 25$), preferably selected from the group consisting of tantalum and niobium, comprising a substantially uniform porous layer of deposited said metal particles thereon.

The present invention further relates to a stable suspension for electrophoretically homogeneously deposition of said metal.

19 Claims, No Drawings

PROCESS FOR MANUFACTURING A METAL ELECTRODE

FIELD OF THE INVENTION

The present invention provides a porous metal electrode, wherein the porosity degree is in the range of 30 to 50% and the metal is capable of forming a stable, uniform, oxide, layer having a dielectric constant greater than 25 ($k \geq 25$), preferably selected from the group consisting of tantalum and niobium, comprising a substantially uniform porous layer of deposited said metal particles thereon. The present invention further provides a process for manufacturing the same metal electrode for applying in a dry electrolytic capacitor. The term "metal" in this application referred to any metal that capable of forming a stable oxide layer having a dielectric constant greater than 25 ($k \geq 25$). Ta and Nb are typical representatives of such metals. The process of present invention provides a substantially uniform porous layer of deposited said metal particles thereon. The present invention further relates to a stable suspension for electrophoretically homogeneously deposition of said metal.

BACKGROUND OF THE INVENTION

The production of a metal capacitor, wherein the metal is capable of forming a stable oxide layer having a dielectric constant greater than 25 ($k \geq 25$), preferably selected from the group consisting of tantalum and niobium, comprises some common general steps. Just for the sake of simplicity, the description hereunder relates to tantalum: (a) mechanical pressing of tantalum powder around tantalum wire, thus forming a tantalum anode element; (b) sintering the pressed powder at high temperatures (1400-2000° C.) to form a sponge-like structure; (c) anodizing the sintered tantalum-coated tantalum conductor of step (b), thereby yielding $Ta_2O_5$ on the surface of particles and the anode (dielectric formation); (d) forming a $MnO_2$ conductive layer (manganzing) on the formed $Ta_2O_5$; (e) dipping the element into a graphite dispersion and completing the cathode formation process by dipping into a silver dispersion This is a rather cumbersome process that frequently yields a non-homogeneous, tantalum and niobium layer. Furthermore, the thickness of a metal particles layer formed by mechanical pressure is generally limited to over 800 microns. A thinner layer is not producible using conventional mechanical pressing procedures.

In order to improve this process and makes it more economical and technologically rational, the present invention is directed to providing a stable suspension for performing an electrophoretic step intended for replacing the above mentioned mechanical pressing step (a). The major advantage of applying an electrophoretic deposition step in this particular case lies in the possibility of controlling the homogeneity and the thickness of the metal layer formed in step (a).

EPD allows obtaining a thickness of deposit layers in the range from 10 microns to few millimeters. In contradiction, the conventional mechanical EPD allows obtaining a thickness of deposit layers in the range from 10 microns to few millimeters. In contradiction, the conventional mechanical pressing procedure cannot provide a metal particles layer of less than about 800 microns. Consequently, the EPD procedure according to the present invention reduces the capacitor overall size and the effective equivalent serial resistance (ESR).

Electrophoretic deposition processes are well known and are described, inter alia, in the U.S. Pat. Nos. 5,919,347, 6,059,949 and 6,127,283.

However, of the known prior art neither teaches how to obtain homogenously dispersed porous metal electrode applicable in a capacitor, wherein the porosity degree is in the range of 30 to 50% and the metal is capable of forming a stable, uniform, oxide layer having a dielectric constant greater than 25 ($k \geq 25$), preferably tantalum or niobium layer, with required thickness of about 20-500 micron, nor they teach how to obtain the required stable suspension for carrying out the electrophoretic process.

U.S. Pat. No. 4,067,735 discloses a method of making bulk porous anodes for electrolytic capacitors, which comprises preparing a suspension of tantalum or niobium powder and a binding material, and subjecting the suspension to an electric field established by a voltage applied to electrodes, whereby the metal powder and the binder deposit forming bulk porous bodies, which are then sintered at temperatures from 1600 to 2000° C., to produce bulk porous anodes. This process, however, does not permit to control the porosity of the final anodes nor to impart to them desired shapes without high temperature treatments, combined with shape controlling means. The bulk structure, also, is not optimal, and it would be desirable to control the shape of the final electrode without treatments in addition to the electrophoretic deposition.

Thus, there is a need for, and it is an aim of the present invention to provide a stable metal suspension, wherein said metal is capable of forming a stable oxide layer having a dielectric constant greater than 25 ($k \geq 25$), preferably selected from the group consisting of tantalum and niobium, for producing uniform deposition of metal particles in said metal layer, having a controllable range of layer thickness and porosity. It is a further aim of the present invention to provide such a selected from the group consisting of tantalum and niobium, comprising the step of electrophoretic uniform deposition of metal particles onto a substrate comprising said metal conductor.

It is a further object of present invention to provide a stable suspension for electrophoretic homogeneous deposition of said metal, preferably tantalum or niobium particles. A major aspect of the present invention is the use of such stable suspension in the electrophoretic deposition process for obtaining homogeneously dispersed tantalum or niobium particles in a substantially uniform thickness layer. This layer may have a wide range of thickness, from a few microns to millimeters, and may be obtained in several minutes.

It is an additional object of present invention to provide a metal, preferably tantalum or niobium anode for use in capacitors, wherein such an electrode comprises uniformly dispersed tantalum or niobium particles within said tantalum or niobium layer thereof.

SUMMARY OF THE INVENTION

According to present invention there is provided a porous metal electrode, wherein the porosity degree is in the range of 30 to 50% and the metal is capable of forming a stable, uniform, oxide layer having a dielectric constant greater than 25 ($k \geq 25$), preferably selected from the group consisting of tantalum and niobium, with a controllable desired thickness and porosity, comprising a substantially uniform layer of deposited metal particles thereon. A stable suspension and electrophoretic process for producing said porous metal electrode are provided, as well.

DESCRIPTION OF THE INVENTION

The present invention relates to a process for the production of a porous electrode comprising a homogeneous deposited metal layer, wherein the metal is capable of forming a stable, uniform, oxide layer having a dielectric constant greater than 25 ($k \geq 25$), preferably selected from the group consisting of tantalum and niobium, on the surface of said metal conductor. The process comprises the use of a stable suspension comprising uniformly dispersed said metal particles. For the sake of simplicity, the description of the process hereunder relates to tantalum:

(a) preparation of a homogenous suspension of tantalum particles, comprising tantalum particles, preferably in size range of 1 to 10 microns, in a polar solvent. If so desired, the larger particles are removed from the suspension by conventional means (decantation, filtration, etc.). The concentration of the metal particles in the suspension is dependent on the desired thickness of the deposit layer;

(b) electrophoretic deposition of tantalum particles from said suspension onto the surface of tantalum conductor to form a tantalum layer on the surface of the tantalum conductor;

(c) sintering the deposited tantalum layer. The process further optionally comprises the steps:

(d) anodization of the sintered deposited tantalum layer of step (c) to produce $Ta_2O_5$ on the surface;

(e) dipping the layer formed in step (d) into an aqueous solution of manganese nitrate for producing a $MnO_2$ layer, thus forming the cathode.

Step (b) of the above process, i.e., the electrophoretic deposition of tantalum, includes the sub-steps of:

(I) adding an additive (a) charging agent such as, for example, acetyl acetone (AcAc)+Emphose® (phosphate ester), $AlCl_3$, Poly-diallyldimethylammonium chloride (PDAD-MAC), ortan-850E (polyacrylic acid potassium salt) etc. and optionally a dispersant (such as, for example, ketones, polyethyleneglycols, copolymer organic pigments and $TiO_2$ etc.) to the suspension of step (a), wherein the polar solvent is preferably n-butanol for depositing tantalum and ethanol for depositing niobium;

(II) passing a direct electrical current through the suspension, by means of a deposition electrode and counter electrode therein. A tantalum conductor in the form of a foil on which it is desired to deposit the layer of tantalum, is used as the said deposition electrode. The counter electrode may include an inert electrode made from rhodium, platinum palladium, or anodically dissolved electrode made from tantalum or niobium.

The preferred polar solvent in step (a) is n-butanol for tantalum suspension and ethanol for niobium suspension. However, other polar organic solvents and mixtures of water and polar organic solvents are applicable, as well. According to a preferred embodiment of the present invention, the tantalum or niobium particles in the suspension are positively charged, and consequently they are deposited on the cathode. However, they may be negatively charged, using for example, polyacrilic acid as an additive, in which case they are deposited on the anode.

The electrode, onto which the charged tantalum or niobium particles are deposited, is referred herein as "deposition electrode".

To impose de-agglomeration of the charged tantalum or niobium particles, the suspension is subjected to ultrasound treatment at 20 kHz and a power level of up to about 550 watts, for 5-15 minutes with pulses (on and off, every 2-8 seconds), prior the step (b). Additives such as pH and conductivity adjustment agents, charging agents, dispersants and binders may be added to the suspension. Some additives, such as, for example, Emphos may act as charging agent and buffer (i.e. pH and conductivity adjustment agent, simultaneously). The preferred charging agents for tantalum or niobium are Emphos (phosphate ester), $AlCl_3$ and PDADMAC serving as pH and conductivity adjustment agents. These additives allow to charge tantalum or niobium particles positively and control the pH and conductivity of the tantalum or niobium suspensions to provide desired conditions for electrophoretic deposition of tantalum or niobium particles. The preferred dispersant is acetylacetone, which has been found to allow the electrophoretic deposition of tantalum or niobium particles to form a homogenous, smooth, uniform layer.

The selected counter electrode materials should be electrically conductive, optionally inert under the conditions of the present process and they should eliminate the possibility of contamination of the formed Ta or Nb deposition layer with dissolved other metal particles like Ni, Fe, Cr. In the case of organic additives, an anode made from inert materials, such as rhodium, platinum or palladium is preferred. In the case of inorganic additives, such as $AlCl_3$ non-inert anodes, made from tantalum (for Ta deposition) or niobium (for Nb deposition) may be used. Consequently, in an electric field this anode dissolves anodically in the suspension to provides ions (Ta3+, Ta5+, Nb3+, Nb5+etc.), which are known to play a role in charging the particles in the suspension and thereby increase particles mobility.

The deposition electrode is tantalum or niobium foil, whereas the preferred counter electrode is either rhodium, platinum, palladium or tantalum, in the case of $AlCl_3$, as additive.

In step (II) the cathode and anode are immersed into the tantalum or niobium suspension, and a direct electrical current is passed between the electrodes. Deposition of tantalum or niobium from the suspension according to step (b) can be carried out either at a substantially constant current (the preferred range of current densities being between about 0.1 $mA/cm^2$ and about 5 $mA/cm^2$) or at a substantially constant voltage. The voltage range is between about 30 volts to about 500 volts, depending on the additive-solvent-solid load system. Deposition times may range from a few minutes to over 15 minutes, preferably 60-90 seconds, depending on the desired thickness of the formed tantalum or niobium layer. The deposition quality depend on type and concentration of dispersed materials, type of solvent, type and concentration of additives, deposition conditions, etc. and on required deposit properties, such as thickness, density, uniformity, etc.

Preferably, before the metal suspension, wherein the metal is selected from the group consisting of tantalum and niobium, is used for uniformly deposition of, for example, tantalum particles onto a tantalum deposition electrode (step (b)), a "pre-processing" initiating step is required for "starting up" the suspension. The charging mechanism of the tantalum particles in the suspension has not been yet studied in full. As known, metal and non-oxide materials (such as carbides and nitrides), unlike oxides, demand some initiating step of EPD process. An electric field is needed in order to charge the particles.

For running the pre-processing step a temporary cathode, such as, for example, tantalum foil is used as a deposition electrode and a temporary counter electrode, may be, for example, Pt. A direct electrical current having a constant current density of about 3 (or 0.1-5) $mA/cm^2$ is passed between the electrodes for about 30-60 minutes (electrification). The constant conductivity is maintained at 0.1-3 μS/cm in organic solvents and 10-300 μS/cm in water. The high values are typical for water. Following this pre-processing step, the temporary tantalum (or niobium) electrode is removed (this electrode can be recycled) and another Ta (or Nb) foil onto which it is desired to deposited the tantalum (or niobium) layer is inserted into the suspension as a deposition electrode. For processing step (b), a direct electrical current having a constant current density of about 3 (0.1-5) mA/cm$^2$ is passed between the electrodes for about 15 minutes.

As an alternative to the above described pre-processing charging step the metal particles may be charged by stirring the suspension for about 12 hours, followed by ultrasonic treatment.

Etching or sandblasting of the deposition electrode surface before deposition (step (b)), provides high adhesion of the deposited tantalum or niobium. The subsequent sintering of the obtained tantalum- or niobium-coated tantalum (or niobium) foil conductor (step (c)) is carried out in a furnace.

The following examples are provided merely to illustrate the invention and are not intended to limit the scope of the invention in any manner.

EXAMPLE 1

A suspension was prepared by dispersing 25 g tantalum powder in 100 ml of n-butanol. The suspension was cooled to about 10° C. and subjected to ultrasonic treatment at 20 KHz and a power level of up to 550 Watts for 5 minutes at pulse regime ("on" 8 seconds and "off" 8 seconds). 1000 μl Pure (100%) Emphose (phosphate ester) and 250 μl acetyl acetone (AcAc) were added to the suspension to adjust the pH to about 4 and conductivity of the suspension to about 1 μS. In the pre-processing step, a direct electrical current having a constant current density of about 3 mA/cm$^2$ was passed between the electrodes tantalum foil and Pt for about 30-60 minutes. The constant conductivity was maintained at 1 μS. Following this pre-processing step, the temporary tantalum foil electrode was removed and another Ta foil was inserted into the suspension as a deposition electrode onto which it is desired to deposit the tantalum layer. A direct electrical current having a constant current density of about 3 mA/cm$^2$ was passed between the electrodes for about 15 minutes. The constant conductivity was maintained at 1 μS.

The tantalum-coated Ta foil was removed from the suspension, and dried in open air for a few minutes. The electrophoretic process provided a uniform tantalum coating with a thickness of about 200 μm. The coating thickness was evaluated using optical means. The green density was about 35% with about 5 μ roughness.

EXAMPLE 2

A suspension was prepared by dispersing 25 g tantalum powder in 100 ml of n-butanol. The suspension was cooled to 10° C. and subjected to ultrasonic treatment at 20 KHz and a power level of up to 550 Watts for 5 minutes ("on" 8 and "off" 8 seconds). 300 μl AlCl$_3$ (0.01M in ethanol) were added to the suspension to adjust the conductivity to about 1 μS and pH to about 5. For the pre-processing step tantalum foil was used as deposition electrode and Ta was used as counter electrode. A direct electrical current having a constant current density of about 3 mA/cm$^2$ was passed between the electrodes for about 30-60 minutes. Following this pre-processing step, the temporary tantalum foil electrode was removed and another Ta foil was inserted into the suspension as a deposition electrode onto which it is desired to deposit the tantalum layer. Ni was used as counter electrode. A direct electrical current having a constant current density of about 3 mA/cm$^2$ was passed between the electrodes for about 15 minutes. The constant conductivity was maintained at 1 μS, by adding AlCl$_3$.

The tantalum-coated Ta foil was removed from the suspension, and dried for a few minutes. The electrophoretic process provided a uniform tantalum coating with a thickness of about 200 μm. The coating thickness was evaluated by optical means. The green density was about 35% with about 10 μ roughness.

EXAMPLE 3

A suspension was prepared by dispersing 10 g tantalum powder in 100 ml of n-butanol. The suspension was cooled to 10° C. and subjected to ultrasonic treatment at 20 KHz and a power level of up to 550 Watts for 5 minutes (with 2 seconds pulses). 100 μl of 20% by weight poly-diallyldimethylammonium chloride (PDADMAC) aqueous solution were added to the suspension followed by sonication for one additional minute to adjust the conductivity to about 2 μS and pH to about 3.5. For the pre-processing step tantalum foil was used as deposition electrode and Pt was used as counter electrode. A direct electrical current having a constant current density of about 1 mA/cm$^2$ was passed between the electrodes for about 30 minutes. Following this pre-processing step, the temporary tantalum foil electrode was removed and another Ta foil was inserted into the suspension as a deposition electrode onto which it is desired to deposit the tantalum layer. Pt or Ta was used as counter electrode. A direct electrical current having a constant current density of about 1 mA/cm$^2$ was passed between the electrodes for about up to 30 minutes. The constant conductivity was maintained at 2 μS, by adding PDADMAC solution.

The tantalum-coated Ta foil was removed from the suspension, and dried for a few minutes. The electrophoretic process provided a uniform tantalum coating with a thickness of about 300 μm. The coating thickness was evaluated by optical means. The green density was about 35% with about 10 μ roughness.

The tantalum suspension for electrophoretic deposition prepared in the procedure as described in Example 3 found to be very stable at a room temperature for a period of at least 12 hours.

The procedure of Example 3 may be carried out applying various conditions —as follows:

(a) 5-1000 μl PDADMAC; pH 3.2-3.9; conductivity (μS/cm) 0.1-1.5

(b) 5-1000 μl PDADMAC; pH 6.4-6.5; conductivity (μS/cm) 0.1-1.3

(c) 5-1000 μl PDADMAC; 5-200 μl dispersant; pH 3.0-3.5; conductivity (μS/cm) 0.5-3.5. The dispersant may be selected from ketones (for example, acetylacetone), polyethyleneglycols (for example, PEG-400) and copolymer organic pigments and TiO$_2$ (for example, Disperbyk serval types).

(d) 5-1000 μl PDADMAC; 5-200 μl dispersant; pH 6.3-6.4; conductivity (μS/cm) 0.5-3.5. The dispersant may be selected from ketones (for example, acetylacetone), polyethyleneglycols (for example, PEG-400) and copolymer organic pigments and TiO$_2$ (for example, Disperbyk serval types).

Other nitrogen-containing compounds such as polymethyleneimine (PEI), copolymer-poly (dimethylamine-co-epichlorohydrine-co-ethylenediamine) and poly (acrylamide-co-diallyldimethyl-ammonium chloride may substitute PDADMAC.

EXAMPLE 4

A suspension was prepared by dispersing 10 g niobium powder in 100 ml of ethanol-butanol. The suspension was cooled to 10° C. and subjected to ultrasonic treatment at 20 KHz and a power level of up to 550 Watts for 5 minutes (with 2 seconds pulses). 100 μl Emphos were added to the suspension followed by sonication for one additional minute to adjust the conductivity to about 3 μS and pH to about 3.5. For the pre-processing step niobium foil was used as deposition electrode and Pt was used as counter electrode. A direct electrical current having a constant current density of about 1 mA/cm$^2$ was passed between the electrodes for about 30 minutes. Following this pre-processing step, the temporary niobium foil electrode was removed and another niobium foil was inserted into the suspension as a deposition electrode onto which it is desired to deposit the niobium layer. Pt was used as counter electrode. A direct electrical current having a constant current density of about 1 mA/cm$^2$ was passed between the electrodes for about up to 30 minutes. The constant conductivity was maintained at 3 μS, by adding Emphos solution. The niobium-coated niobium foil was removed from the suspension, and dried for a few minutes. The electrophoretic process provided a uniform niobium coating with a thickness of about 160 μm. The coating thickness was evaluated by optical means. The green density is 35% with about 5 μ roughness.

The niobium suspension for electrophoretic deposition prepared in the procedure as described in Example 4 found to be very stable at a room temperature for a period of at least 12 hours.

The procedure of Example 4 was carried out with tantalum applying a mixture of 25% ethanol in water as a solvent. Acetylacetone and PDADMAC were used as dispersant and charging agent, respectively. The pH was adjusted to 6-6.3 and the conductivity to 68-245 μS/cm. For preventing the release of H$_2$ gas during the EPD process the voltage was kept low (for example, 10V) and the deposition time short (such as, for example, 3 minutes). The electrophoretic process provided a tantalum layer with a thickness of about 50 μm. The green density was about 30% with about 5 μ roughness.

Similarly, other solvents consisting of mixtures of water and organic polar solvents may be used for preparing the suspensions for electrophoretic deposition of metal particles according to the present invention.

The invention claimed is:

1. An electrophoretic process for producing a porous metal electrode,
   wherein said electrode comprises a metal, capable of forming a stable oxide layer having a dielectric constant equal to or greater than 20, selected from the group consisting of tantalum and niobium,
   wherein said metal electrode comprises a substantially uniform porous layer of deposited particles of said metal having a porosity degree in the range of 30 to 50% deposited thereon, which process comprises the steps of:
   (a) providing a metal suspension of said metal in a polar solvent;
   (b) immersing a temporary cathode and a counter electrode in said suspension, and running a pre-processing initiating step by electrifying said temporary cathode as a deposition electrode;
   (c) replacing said temporary cathode with a new deposition electrode wherein said new deposition electrode is constituted by a metal foil; and
   (d) electrifying said new deposition electrode, so to cause electrophoretic homogeneous deposition of said metal particles onto the surface of said new deposition electrode.

2. An electrophoretic process according to claim 1,
   wherein the polar solvent is selected from the group consisting of an organic polar solvent, water and a mixture of water and polar organic solvent(s).

3. An electrophoretic process according to claim 1,
   wherein the metal is tantalum and said polar solvent is n-butanol.

4. An electrophoretic process according to claim 1,
   wherein the metal is niobium and said polar solvent is ethanol.

5. An electrophoretic process according to claim 1,
   wherein the metal suspension contains at least one additive chosen from the group consisting of pH and conductivity adjustment agents for controlling the pH and conductivity of said metal suspension.

6. An electrophoretic process according to claim 5,
   wherein said additive comprises phosphate ester.

7. An electrophoretic process according to claim 5,
   wherein said additive comprises AlCl$_3$.

8. An electrophoretic process according to claim 5,
   wherein said additive comprises poly-diallyldimethylammonium chloride (PDADMAC).

9. An electrophoretic process according to claim 5 wherein the pH and the conductivity are controlled to be in the range of 3-11 and in the range of 0.1-250 μS/cm respectively.

10. An electrophoretic process according to claim 5,
    wherein the metal suspension further contains at least one dispersant.

11. An electrophoretic process according to claim 10,
    wherein said dispersant is acetyl acetone.

12. An electrophoretic process according to claim 10,
    wherein said additive and said dispersant are phosphate ester and acetyl acetone, respectively.

13. An electrophoretic process according to claim 1,
    wherein the counter electrode selected from the group consisting of rhodium, palladium, platinum, tantalum and niobium.

14. An electrophoretic process according to claim 1,
    wherein the metal suspension contains phosphate ester and acetyl acetone and the counter electrode is selected from rhodium, palladium and platinum.

15. An electrophoretic process according to claim 1,
    wherein the metal suspension contains AlCl$_3$ and the counter electrode comprises a metal selected from niobium and tantalum.

16. An electrophoretic process according to claim 1,
    wherein the metal is tantalum, the tantalum suspension contains phosphate ester and acetyl acetone, and the counter electrode is selected from rhodium, palladium and platinum.

17. An electrophoretic process according to claim 1,
    wherein the metal is tantalum, the tantalum suspension contains an additive and/or dispersant selected from the group consisting of phosphate ester, acetyl acetone, AlCl$_3$ and PDADMAC, and the counter electrode is selected from rhodium, palladium and platinum.

18. An electrophoretic process according to claim 1,
    wherein the metal is niobium and niobium suspension contains phosphate ester, and the counter electrode is Pt, Pd, or Nb.

19. An electrophoretic process for producing a porous metal electrode according to claim 1,
    wherein the substantially uniform porous layer of deposited particles has a green density in the range of 25 to 40%.

* * * * *